United States Patent [19]
Wright

[11] 3,770,049
[45] Nov. 6, 1973

[54] VEHICLE COOLING SYSTEM
[76] Inventor: Clarence Wright, Route 1, Box 248, Fairmont, W. Va. 26554
[22] Filed: Oct. 22, 1971
[21] Appl. No.: 191,596

[52] U.S. Cl. .................................. 165/41, 165/51
[51] Int. Cl. ......................................... B60h 3/00
[58] Field of Search ............... 165/51, 41, 42, 17; 126/19.5, 271.1

[56] References Cited
UNITED STATES PATENTS
2,231,586  2/1941  Miller .............................. 126/271.1
3,590,802  7/1971  Fried ................................ 126/19.5

Primary Examiner—Charles Sukalo
Attorney—Fred J. Baehr

[57] ABSTRACT

Radiating means which reduces the temperature of the fluid coolant and melts, or prevents the accumulation of, ice and like compositions on the fender surfaces of the vehicle. Radiating means is positioned adjacent to the fender surfaces and connected to the fluid coolant of the engine by suitable tubing members. Valves placed in the tubing members may be used to regulate the flow of coolant through the radiating means.

2 Claims, 4 Drawing Figures

PATENTED NOV 6 1973    3,770,049

3,770,049

VEHICLE COOLING SYSTEM

BACKGROUND OF THE INVENTION

1. Field of the Invention

This invention relates, in general, to vehicle cooling systems and, more specifically, to vehicle cooling systems which may be used to heat certain areas of the vehicle.

2. Description of the Prior Art

Vehicles having fluid cooled internal combustion engines usually have some form of radiating means to remove heat from the fluid coolant. Typically, this comprises a radiator across which air is blown to remove heat from the coolant flowing within the radiator. Except for the purpose of heating the inside or passenger area of the vehicle, the heat of the fluid coolant is not usually used for any major heating function.

When driving vehicles with snow, ice, rain, etc., on the roadway, there is a tendency for ice to accumulate under the fenders of the vehicle when the temperature is near or below freezing. The ice which forms on the body of the vehicle near its wheels may have impurities contained therein, such as salt, which are harmful to the components of the vehicle.

It is desirable, and it is an object of this invention, to provide a system which prevents the accumulation of ice on the fender surfaces of a vehicle.

Several important advantages may be realized by preventing ice formation under the fenders. Rusting of the metal-work due to reactions with ice melting chemicals is drastically reduced. The extra weight which may be put on the suspension system of the vehicle is practically eliminated. Accumulated ice falling off on roadways and in garages is essentially eliminated. Other advantages of preventing ice formation on vehicle fenders also exist.

The invention disclosed herein not only prevents the formation of ice when conditions are such that ice would form otherwise, but it also aids the cooling function of the fluid coolant of the engine.

With the ever increasing use of accessories, such as air-conditioning, which tend to increase the operating temperature of the vehicle's engine, and the stop-and-go driving now prevailing in most city areas, the cooling capacity of conventional radiating systems is being taxed. Radiating areas, coolant pressures, coolant compositions, and other factors have been modified to increase the cooling capacity of the radiating system.

Therefore, it is desirable, and it is another object of this invention, to provide an ice melting system which also aids in cooling the engine. With the system disclosed herein, each object is achieved without sacrifice of the other, and said system is adaptable to new vehicle construction or as a modification to existing vehicles.

SUMMARY OF THE INVENTION

Radiating means are disposed adjacent to the fender structures of the vehicle and the radiating means are connected, through a tubing system, to the fluid coolant of the engine. The heated fluid coolant flows through the radiating means and returns to the engine of the vehicle. Heat radiated by the fluid coolant in the radiating means melts or prevents the accumulation of ice and like compositions. Due to the radiating effects of the radiating means, the fluid coolant is cooled, thereby providing a reduction in fluid coolant temperature. The radiating means may be disposed adjacent to the inside or outside surfaces of the fender structure, or adjacent to both of said surfaces. Additionally, the radiating means may be constructed of tubing rows, laminations which form coolant channels, or by other suitable members.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
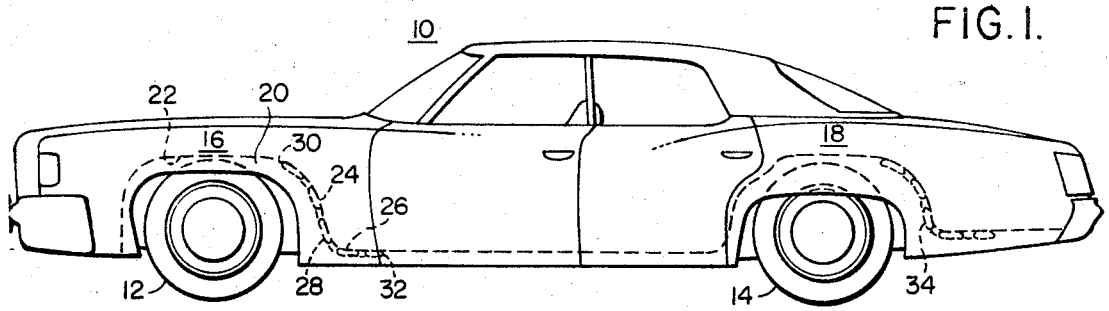
FIG. 1 is a side view of a vehicle having a cooling system constructed according to the teachings of an embodiment of this invention.

Throughout the following description, similar reference characters refer to similar members in all the Figures of the drawings.

Referring now to the drawings, and FIG. 1 in particular, there is shown a vehicle 10 having a cooling system constructed according to the teachings of this invention. The vehicle 10 includes the wheels 12 and 14 which are positioned adjacent to the fender structures 16 and 18, respectively. On most present vehicles, the fender structure comprises an inside portion and outside portion, thus the vehicle 10 is so illustrated. However, it is within the comtemplation of this invention that other types of fender structures may be used with this invention.

The outside portion 20 of the fender 16 has an edge 22 which defines an opening which allows access to the wheel 12. The material forming the outside portion 20 is usually a metallic sheet which is attached to the inside portion 22 of the fender structure. In general, the outside portion 20 of the fender structure 16 is located substantially within a plane which is substantially vertical and is perpendicular to the axis of the wheel 12. The inside portion 22 of the fender structure substantially surrounds the wheel 12 and comprises flat metallic members which are generally positioned perpendicularly to the outside portion 20.

The inside portion 22 includes substantially horizontal, vertical and sloping sections which define the inside fender area. Accumulation of ice tends to be the greatest in the regions behind the wheel. In FIG. 1, the wheel tends to throw the ice forming materials on the back section 24 and the bottom section 26 of the inside portion 22. According to this invention, a radiating means 28 is disposed adjacent to the sections of the fender structure 16 which normally would have ice accumulated thereon.

The area of the inside portion 22 of the fender structure 16 which would be covered by the radiating means 28, and the position of the front edge 30 and the back edge 32 of the radiating means 28, depends largely on the type of vehicle and the performance required. Generally, sufficient melting performance is obtainable with the radiating means 28 extending from the upper area of the back section 24 to a position along the bottom section 26.

A similar radiating means 34 is positioned adjacent to the surfaces of the fender structure 18 shown in FIG. 1. The shape, position, performance, etc., of the radiating means 34 is substantially identical to the radiating means 28. Both radiating means, in addition to other radiating means positioned at the other fender structures of the vehicle, are supplied with a heated fluid which provides the heat necessary to melt the ice or prevent the formation of ice. The heated fluid is provided by the internal combustion engine of the vehicle.

Figure 2:
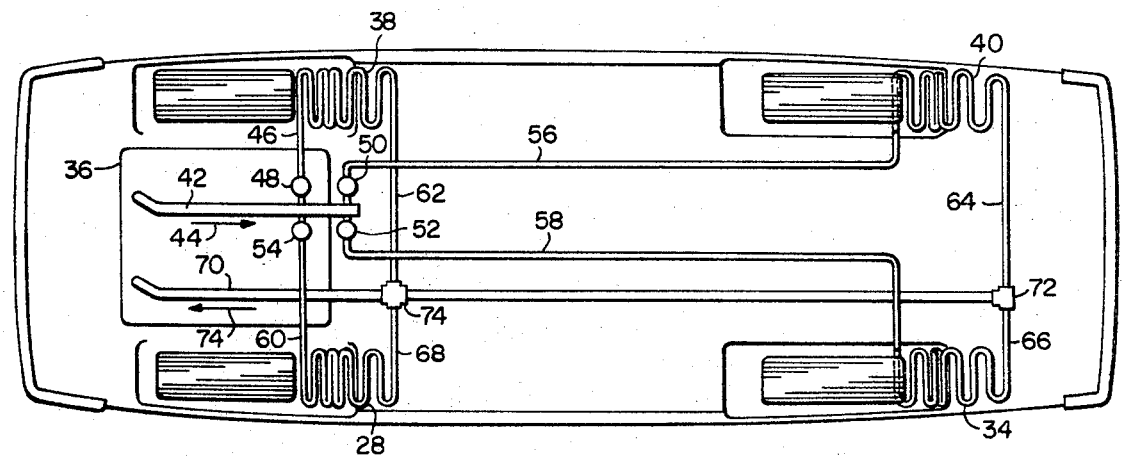
FIG. 2 is a top view of a vehicle showing schematically a cooling system constructed according to the teachings of this invention.

FIG. 2 is a schematic view of a vehicle having radiating means at each wheel location. Although other types of radiating means may be used, as will be described hereinafter, the radiating means shown in FIG. 2 consists of rows of tubing which are interconnected to provide a continuous flow path for the heated fluid. The engine 36 of the vehicle contains a fluid coolant which helps to decrease the operating temperature of the engine 36. The fluid coolant is circulated throughout the engine 36 by a pump mechanism. A conventional radiator structure may be used to cool a portion of the fluid coolant. However, it is within the contemplation of this invention that the conventional radiator structure may be eliminated and the cooling of the fluid coolant accomplished entirely by the radiating means 28, 34, 38 and 40.

An inlet tube 42 is connected into the cooling system of the engine 36 in such a manner that fluid coolant flows through the tube in the direction indicated by the arrow 44. A branch tube 46 permits the flow of the fluid coolant to the radiating means 38. The valve 48 may be adjusted to vary the flow rate through the radiating means to provide the proper amount of heat radiation. The valves 50, 52 and 54 and the branch tubes 56, 58 and 60 provide similar flow paths to the radiating means 49, 34 and 28, respectively. Return tubes 62, 64, 66 and 68 provide flow paths for the fluid coolant leaving the radiating means 38, 40, 34 and 28, respectively. Couplings 72 and 74 connect the return flow paths to the outlet tube 70 which returns the fluid coolant, in the direction indicated by the arrow 74 to the engine 36 where it recirculates through the engine 36.

Figure 3:
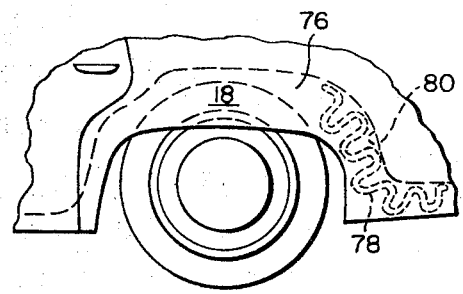
FIG. 3 is a partial side view of a vehicle having a cooling system constructed according to the teachings of another embodiment of this invention.

FIG. 3 illustrates an embodiment of this invention wherein the outside portion 76 of the fender structure 18 has a radiating means 78 disposed adjacent thereto. This provides ice melting capability to this portion of the fender structure and also enhances the cooling capability of the radiating means due to the free air on both sides of the outside portion 76. The radiating means 78 may be used separately or together with the radiating means 34. The radiating means 34 and 78 may be constructed separately and connected in series flow path relationship, or they may be constructed from the same tubing rows which are bent over from the back section 80 to the side portion 76. Other construction arrangements are also within the contemplation of this invention and radiating means may be positioned adjacent to the outside portions of the other fender structures of the vehicle 10.

The radiating means described herein may be constructed in several different arrangements. The coolant channels may be provided by rows of tubing constructed of a suitable material, such as copper. The rows may be, as shown in FIG. 2, connected at alternate ends to adjacent tubing rows. Many other connecting arrangements and orientations of the tubing may be made within the contemplation of this invention. The tubing may be positioned adjacent to the surfaces of the fender structure so that the thrown ice, or other like compositions, hits the tubing and melts. The heat radiating effect of the tubing would warm the fender surfaces and help melt compositions striking adjacent fender surfaces. The tubing rows may be attached directly to the surfaces of the fender structure to transmit heat thereto by conduction.

Figure 4:
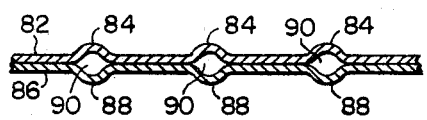
FIG. 4 is a sectional view of a laminated radiating means.

A laminated radiating means, as illustrated in FIG. 4, may also be used. In the embodiment shown, a top lamination member 82 with ridges 83 therein is secured to a bottom lamination member 86 with ridges 88 therein, by a suitable process. The fluid coolant flow through the channels 90 formed by the ridges 84 and 88. This type of radiating member may be positioned adjacent to the surfaces of the fender structure or may actually form the surface of the fender structure. If used as the outside portion of the fender structure, it may be desirable to make one lamination member flat for appearance purposes.

Although described with engine coolant systems, the radiating means may receive heat energy from other means. It is when the contemplation of this invention that any energy derived from the operation of the internal combustion engine may be used to provide the heat energy for the radiating means. Heat produced by $I^2 R$ losses produced by the electrical system and heat produced by the exhaust system may be used.

There has been disclosed herein new and useful apparatus for improving the cooling capacity of vehicle cooling systems and eliminating the formation of ice, and like compositions, near the fender structures of the vehicle. Since numerous changes may be made in the above described apparatus and different embodiments of the invention may be made without departing from the spirit thereof, it is intended that all of the matter contained in the foregoing description or shown in the accompanying drawings, shall be interpreted as illustrative rather than limiting.

I claim as my invention:

1. A cooling system for vehicles having an internal combustion engine, said cooling system comprising radiating means located adjacent to a fender structure of the vehicle in such a manner that heat is dissipated by said radiating means, and tubing means extending from the engine to said radiating means, said tubing means being connected into the flow path of the fluid coolant of the engine in such a manner that a portion of the fluid coolant flows through the radiating means, said radiating means including an array of tubing through which the fluid coolant flows, said array of tubing being located substantially along the rear portion of the fender structure, and the tubes in said array being positioned sufficiently close together to provide a greater heat concentration in said array than in said tubing means.

2. A cooling system for vehicles having an internal combustion engine, said cooling system comprising an inlet tube which carries heated coolant from the engine, radiating means located adjacent to each fender of the vehicle, branch tubes which carry heated coolant from said inlet tube to said radiating means, valve means which independently regulates the flow of coolant through each of said branch tubes, said radiating means comprising rows of tubing interconnected in a serpentiform arrangement to conduct the fluid coolant through each of said rows of tubing, with a greater number of said rows of tubing located toward the rear of the car from the center of each fender, an outlet tube, return tubes which carry the fluid coolant from said radiating means to said outlet tube, said outlet tube being connected to the engine in such a manner that the coolant from the outlet tube flows through the engine and then flows into said inlet tube, said rows of tubing being sufficiently close together to provide a greater heat concentration in the radiating means than in said branch tubes.

* * * * *